(12) United States Patent
Bitzer

(10) Patent No.: US 7,174,246 B2
(45) Date of Patent: Feb. 6, 2007

(54) METHOD AND SYSTEM FOR REGULATING THE TORQUE-TRANSMISSION CAPACITY OF A FRICTIONALLY ENGAGED, TORQUE TRANSMITTING ASSEMBLY

(75) Inventor: Franz Bitzer, Friedrichshafen (DE)

(73) Assignee: LuK Lamellen und Kupplungsbau Betelligungs KG, Bühl (DE)

( * ) Notice: Subject to any disclaimer, the term of this patent is extended or adjusted under 35 U.S.C. 154(b) by 222 days.

(21) Appl. No.: 10/480,751

(22) PCT Filed: Jun. 7, 2002

(86) PCT No.: PCT/DE02/02073

§ 371 (c)(1),
(2), (4) Date: Jun. 22, 2004

(87) PCT Pub. No.: WO02/101264

PCT Pub. Date: Dec. 19, 2002

(65) Prior Publication Data
US 2004/0254705 A1 Dec. 16, 2004

(30) Foreign Application Priority Data
Jun. 13, 2001 (DE) .............................. 101 28 681
Jul. 23, 2001 (DE) .............................. 101 35 852

(51) Int. Cl.
G06F 17/00 (2006.01)
(52) U.S. Cl. .................................................... 701/51
(58) Field of Classification Search ................ 701/51, 701/52, 67, 84, 87; 477/34; 475/43, 125–126, 475/195, 257
See application file for complete search history.

(56) References Cited

U.S. PATENT DOCUMENTS

| | | | | |
|---|---|---|---|---|
| 4,760,902 A | | 8/1988 | Belanger | 192/0.033 |
| 4,793,454 A | * | 12/1988 | Petzold et al. | 477/39 |
| 5,772,557 A | * | 6/1998 | Tasaka et al. | 477/162 |
| 5,941,923 A | * | 8/1999 | Fischer et al. | 701/53 |
| 5,950,789 A | | 9/1999 | Hosseini et al. | 192/85 R |
| 6,283,893 B1 | | 9/2001 | Fritzner et al. | 477/176 |
| 6,547,692 B1 | | 4/2003 | Ries-Mueller et al. | 477/45 |

FOREIGN PATENT DOCUMENTS

| | | |
|---|---|---|
| DE | 195 44 061 A1 | 6/1996 |
| DE | 199 59 470 A1 | 6/2000 |
| DE | 100 28 459 A1 | 12/2000 |

* cited by examiner

Primary Examiner—Y. Beaulieu
(74) Attorney, Agent, or Firm—Alfred J. Mangels

(57) ABSTRACT

A method and system for regulating the torque transmitting capacity of a frictionally-engaged torque-transmitting assembly located in the drive train of a motor vehicle. The torque-transmitting assembly has an input and an output, the values of which, such as input torque and output torque, are detected by sensors. The torque values are subjected to a correlation calculation in which a correlation value is calculated. The difference value between the calculated correlation value and a predetermined correlation target value is determined. An adjustment value is determined to reduce the difference value if the difference value exceeds a preset threshold value.

8 Claims, 5 Drawing Sheets

METHOD AND SYSTEM FOR REGULATING THE TORQUE-TRANSMISSION CAPACITY OF A FRICTIONALLY ENGAGED, TORQUE TRANSMITTING ASSEMBLY

BACKGROUND OF THE INVENTION

1. Field of the Invention

The present invention relates to a method and a system for regulating the torque-transmitting capacity of a frictionally-engaged torque-transmitting assembly, especially an assembly in the drive train of a motor vehicle.

2. Description of the Related Art

Assemblies that transmit torque in a frictionally-engaged manner in the drive train of a vehicle, such as clutches, including converter lockup clutches in the converter of an automatic transmission, transmissions with endless torque-transmitting means having continuously value transmission ratios (CVT transmissions, friction wheel drives), including brakes, are increasingly automated or operated by their own actuators. The control or the regulation of the frictionally-engaged transmittable torque of the respective assembly should be as low as possible for easing the burden of the actuators, as well as for reasons of low energy consumption and high control or regulation accuracy, but it should be high enough to prevent permanent slippage that can lead to rapid wear or to the destruction of the frictionally-engaged torque-transmitting assembly. Especially because of the latter reason, most of the time an opposite, contact overpressure of the frictionally-engaged torque-transmitting assemblies results. A contact overpressure also generally results because wear of components, settling phenomena, temperature influences, or viscosity-related parameter changes then do not lead to unintended slippage.

One possibility for detecting the slippage condition of two frictionally-engaged torque-transmitting assemblies is known from DE 195 44 061. To detect the adhesion or sliding limits, a pressure-medium-operated actuation element that determines the contact force of the two frictionally-engaged components, is supplied with an actuation pressure that is superimposed on a modulation signal. The gradient of the actuation pressure is correlated with a transmission output shaft speed. The actuation pressure is readjusted In accordance with whether a predetermined correlation value is exceeded or not achieved. It is characteristic of the previously-known method that a sensor must be provided for detecting the modulated pressure and that the correlation calculation can be more difficult by complex phase displacements.

A method for controlling the operation of a frictionally-engaged torque-transmitting assembly is known from DE 199 59 470 A1, in which rotational speed fluctuations of an input element and an output element are correlated with each other without causing the rotational speed fluctuations by modulating the torque-transmitting capacity. One characteristic of that method is that it sweeps a wide frequency range that can be a function of the engine rotational speed, for example, which makes a correlation analysis, such as by means of a Fourier analysis, more difficult.

SUMMARY OF THE INVENTION

The present invention is directed to providing a generic method and system for regulating the torque-transmitting capacity of a frictionally-engaged torque-transmitting assembly, especially an assembly in the drive train of a motor vehicle, that makes possible in a simple execution the control of an operating condition of a frictionally-engaged torque-transmitting assembly in such a way that no unnecessarily high actuation forces are exerted on the frictionally-engaged components of the assembly.

The goal of the invention is achieved with a method for regulating the torque-transmitting capacity of a torque-transmitting assembly that is frictionally-engaged between an input and an output, especially an assembly in the drive train of a motor vehicle, by which method an adjusting value for influencing the torque-transmitting capacity is modulated an output value of the assembly is detected the output value is subjected to a correlation calculation in which a correlation value is calculated and the difference between the calculated correlation value and a predetermined correlation target value is determined and the adjusting value is changed in the direction of a reduction of the difference, if the difference exceeds a preset threshold value, an input value and an output value of the assembly are detected and the correlation value between the input and output values is calculated in the correlation calculation.

The method In accordance with the invention has the advantage that almost no phase shift has to be considered in the correlation calculation between the two detected values because of the equality of action and reaction, which significantly simplifies the evaluation. In addition, no special sensor for the measurement of the modulations of the control signals is needed. The input and output torques, the input and output rotational speeds and their deduced values, such as chronological deductions, etc. can be detected or utilized as input or output values.

It can be especially advantageous for the method for controlling the torque transmission capacity of a torque-transmitting assembly that is frictionally-engaged between an input and an output, especially an assembly in the drive train of a motor vehicle, to impress a modulation signal on an input value for monitoring the quality or quantity of the torque transmitted, for example a pressure signal for pressurizing a endless torque-transmitting means to a conical disk set, whereby at least two measurement values are detected as signal responses between the impression of the modulation signal and the output of the assembly and the at least two measurement values are correlated with each other. The resulting correction value is utilized for the correction of the input value. The measurement values can, for example, be a measurement value provided by a pressure sensor and that can be appropriately prepared and filtered, and/or it could be a slippage component that can be formed, for example, by the rotational speed difference between an input shaft and the output shaft of a CVT transmission whereby, if necessary, a change occurring in the transmission ratio during the determination of the measurement value needs to be considered. In that way a measurement value can be utilized as a reference value that is directly deduced from the control circuit by evaluating two information sources of the assembly. Especially if there is a phase relationship between one measurement value and the modulation signal with a time-delayed signal response, an improvement in the correlation value can be achieved in contrast to a reference signal that is deduced directly from the signal generator that issues the modulation signal.

In accordance with another inventive aspect, by the detection of the input rotational speed and the output rotational speed of an assembly there is the accompanying advantage that no special sensors are required because the appropriate rotational speed sensors are already generally present.

The invention is also directed to a system for regulating the torque-transmitting capacity of a frictionally-engaged torque-transmitting assembly, especially an assembly in the drive train of a motor vehicle, that includes a control device for setting an adjusting value that determines the torque-transmitting capacity of the assembly, a modulation device for modulating the adjusting value, a sensor for detecting an input value of the assembly, a sensor for detecting an output value of the assembly, and an electronic control device with a processor and a storage unit that is constructed in such a way that it carries out the inventive method.

The torque-transmitting assembly, as mentioned above, can be of different types. The invention can be utilized advantageously with a continuously variable transmission.

BRIEF DESCRIPTION OF THE DRAWINGS

The invention is explained in the following description based upon schematic drawings as examples and with additional details.

There is shown in the drawings.

DESCRIPTION OF THE PREFERRED EMBODIMENTS

Figure 1:
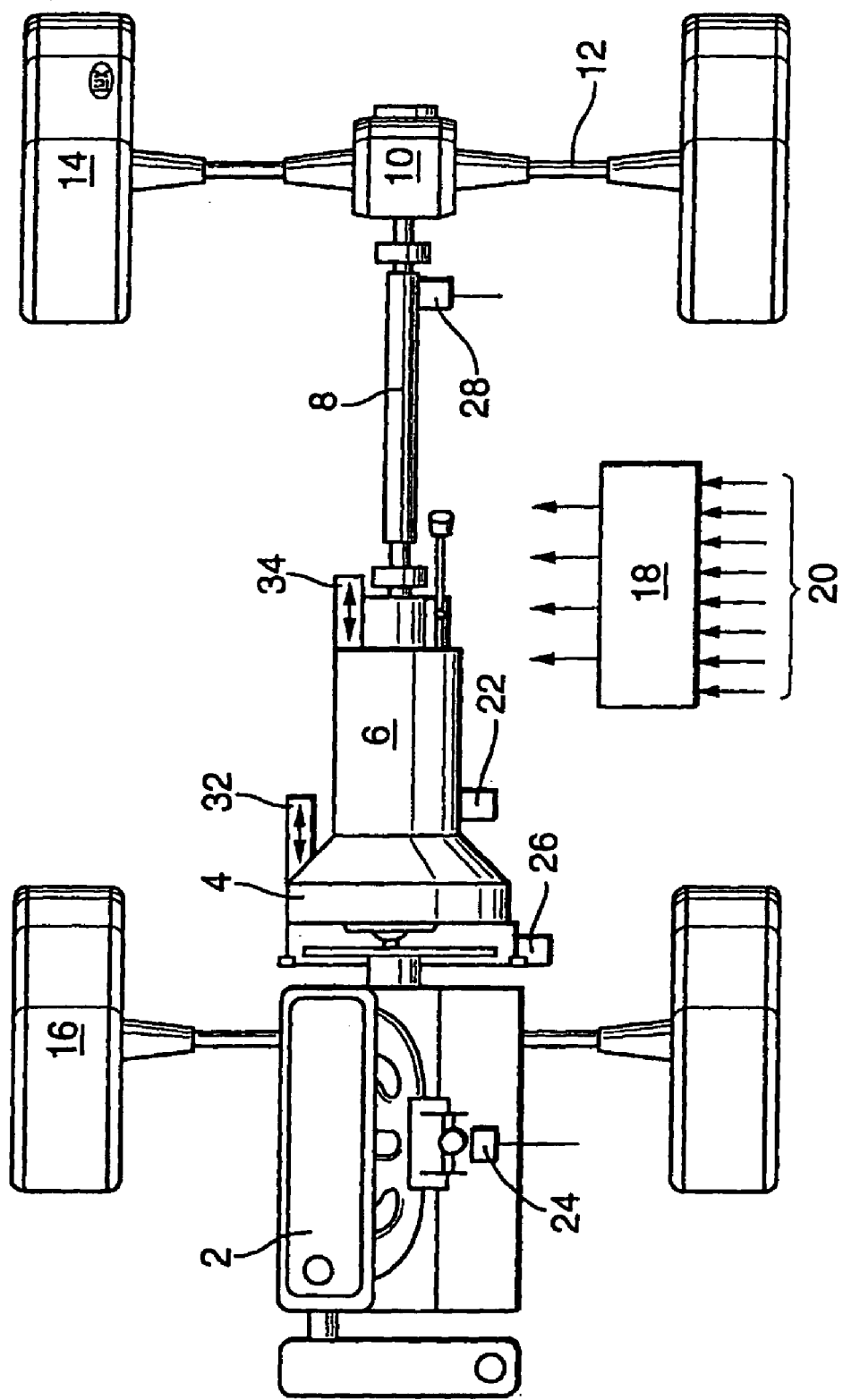
FIG. 1 a diagram of a motor vehicle with a drive train.

In accordance with FIG. 1 a motor vehicle has an engine 2 that is connected by way of a clutch 4 and a transmission 6 with a propeller shaft 8. By way of a differential 10 the propeller shaft drives drive shafts 12 that are non-rotatably connected with the rear wheels 14. The front wheels 16 in the illustrated example are not driven.

An electronic control unit 18 including in a known way a microprocessor with accompanying storage units has inputs 20 that are connected with sensors. As sensors there are provided, for example, a sensor 22 for determining the rotational speed of a transmission input shaft, a throttle-valve sensor 24, an engine rotational speed sensor 26, a propeller shaft rotational speed sensor 28, and, if necessary, additional sensors.

Outputs of the control unit 18 are connected with a clutch actuation device 32 and a transmission actuation device 34, as well as, if necessary with other actuators of the drive train, such as a throttle actuator, and the like.

Transmission 6 in the illustrated example is a CVT transmission, whose actuation unit 34 is controlled hydraulically.

Figure 2:
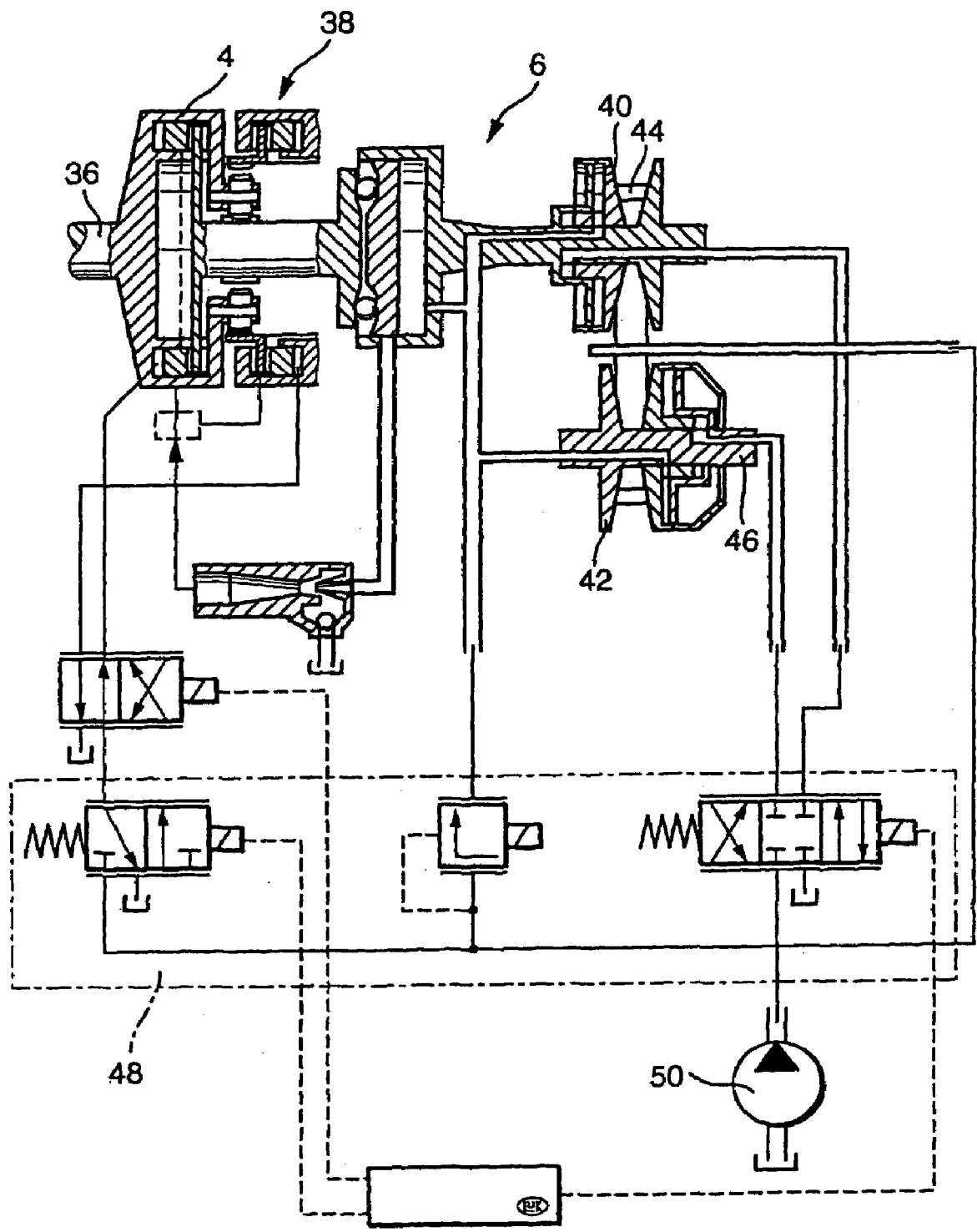
FIG. 2 a section through a CVT transmission with an input-side clutch and an output, FIG. 3 a hydraulic diagram for controlling a CVT transmission, FIG. 4 a further hydraulic diagram for controlling a CVT transmission, FIG. 5 a flow diagram of a control algorithm, and FIGS. 6a to 6e time functions of various signals utilized in carrying out the invention.

FIG. 2 schematically shows important components of the clutch and the transmission of FIG. 1. An input shaft 36 that is non-rotatably connected with the crankshaft of the engine drives, by way of clutch 4 and the reversing set 38, a first conical disk pair 40 of CVT transmission 6. The first conical disk pair 40 is connected with a second conical disk pair 42 by way of an endless torque-transmitting means 44. The endless torque-transmitting means 44 is in frictional engagement with each of the conical disk pairs 40 and 42. Through an output shaft 46 the second conical disk pair 42 drives the differential abutting the transmission in the example of FIG. 2, which in the illustrated example drives the front wheels.

A hydraulic system 48 that is supplied with pressure by a pump 50 serves to control the clutch and the transmission.

The contact pressure of the conical disks against the endless torque-transmitting means results hydraulically, but it can occur differently, for example, by way of an electric motor, a spring, centrifugal force, and the like. It is important that at least one part of the contact pressure is freely controllable by an actuator. Two design variants of a hydraulic contact pressure control are shown in FIGS. 3 and 4.

Figure 3:
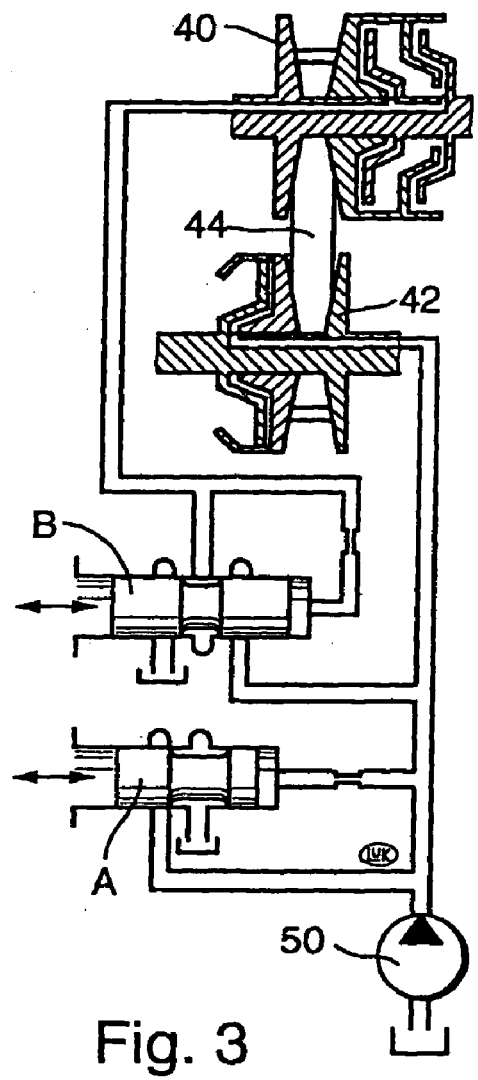

In accordance with FIG. 3, a valve A controls the pressure that is applied to the second conical disk pair 42. A valve B controls the pressure that is applied to the first conical disk pair 40. Thereby, the contact pressure can be controlled with the valve A, while the transmission ratio adjustment takes place together with the valve B. Valve A is freely controllable, for example by an electromagnetic control that is controlled by way of appropriate logic circuits.

Figure 4:
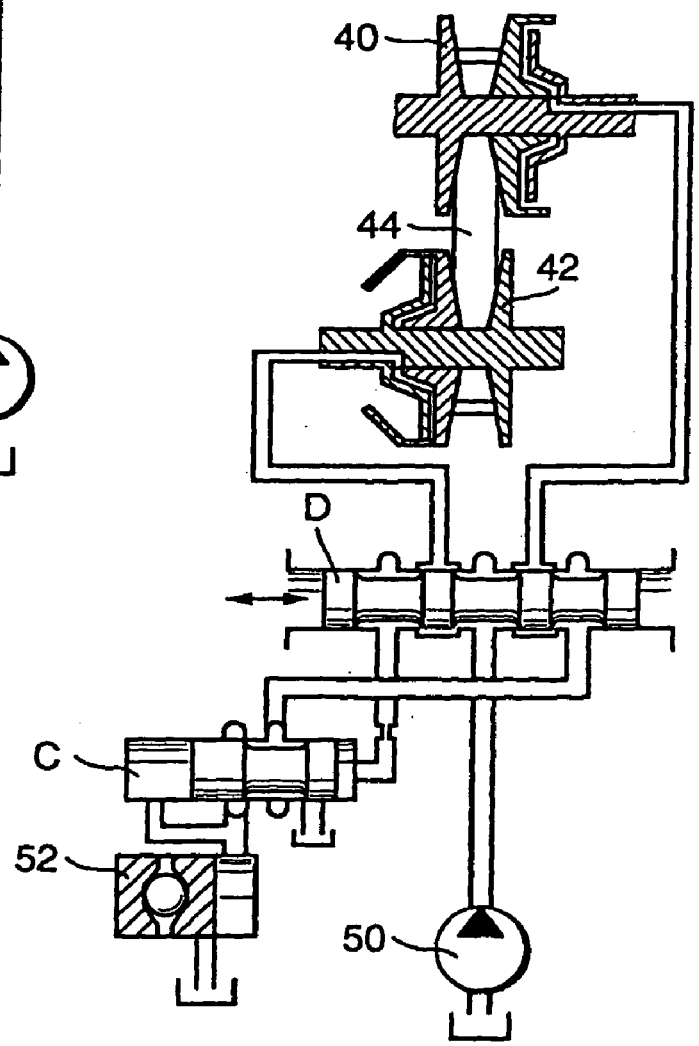

In the embodiment In accordance with FIG. 4, the contact pressure is controlled by a combination of a valve C with a hydraulic mechanical torque sensor 52. The valve C is freely controllable; the torque sensor 52 controls the pressure as a function of the applied torque. Thereby, one part of the contact pressure is freely controllable and a further part as a function of the torque. The adjustment of the conical disk pairs takes place as a result of a differential pressure between the conical disks 40 and 42 by way of a valve D.

Measurement values for the transmission control are, for example, the output signal of the throttle-valve sensor 24 or other measurement or control values with which the output torque of the engine can be estimated.

The components and their arrangements described so far are known as such and will therefore not be explained more precisely with regard to their construction or function.

The contact pressure controlled by valve A of FIG. 3 and of valve C of FIG. 4, with which the conical disk pairs lie against the endless torque-transmitting means 44, should be so low that slippage between the endless torque-transmitting means 44 and the conical disk pairs is avoided, and is not unnecessarily high. The contact pressure is normally pilot controlled by a characteristic field stored in control device 18. It can be fine-tuned or controlled in accordance with other operating parameters.

Figure 5:
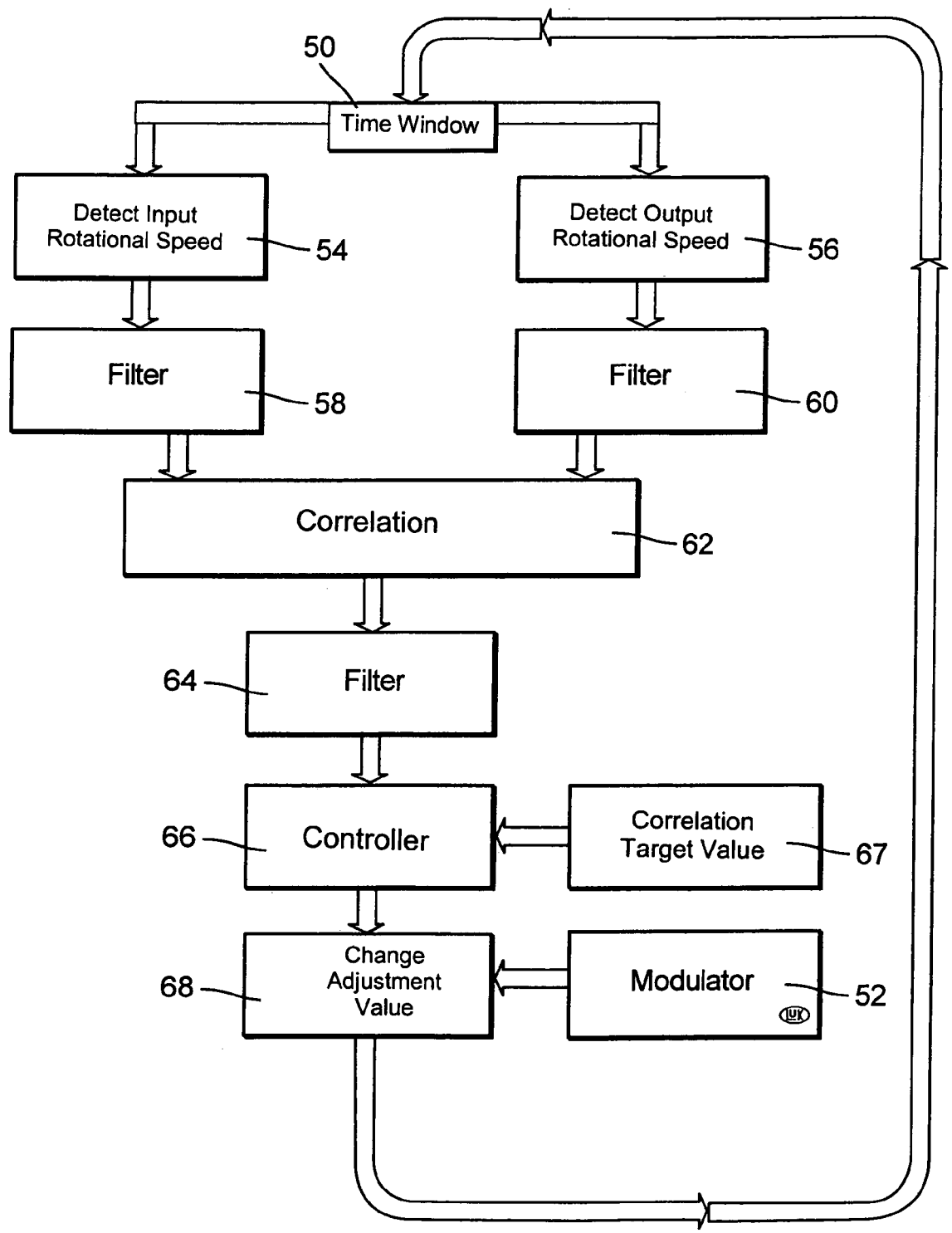

FIG. 5 shows a flow diagram of a method in accordance with which valve A of FIG. 3 or valve C of FIG. 4 can also additionally be suitably actuated in order to correct faulty pilot control values of the valve positions stored in control device 18.

If the control device determines an appropriate actuation time window 50 that is, for example a function of certain operating parameters of the entire drive train, valve A or valve C can be modulated by a modulator in step 52, for example by an adjustment value determined by an electric motor, whereby the modulation amplitude is small compared with the adjustability of the valve or the appropriate adjusting value.

The transmission input rotational speed is detected in step 54 by the sensor 22; at the same time the propeller shaft rotational speed is detected in step 56 by sensor 28, which can be converted with the help of the known transmission ratio of the transmission directly into the transmission output rotational speed. It is advantageous if sensor 28 is not located on the propeller shaft but detects the rotational speed of the transmission output shaft directly, similar to sensor 22, as the measurement results will not be falsified by deflections and swinging masses between the output shaft of the transmission and the propeller shaft.

The input rotational speeds and the output rotational speeds over the course of time as measured during the activation time window, which speeds are stored in a suitable memory of control unit 18, are filtered, for example subjected to low-pass, band-pass, and high-pass filtering in filtering steps 58 and 60, in order then to be forwarded to a correlation calculation in step 62, in which the correlation between the filtered signal patterns is determined. After further filtering in step 64, the calculated correlation value is forwarded to a controller in step 66 in which the calculated correlation value is compared with the correlation target value 67 stored in control unit 18. In step 66 a correction value that corresponds with the variation between the correlation target value and the calculated actual correlation value is generated by the controller and leads in step 68 to a change of the position of the valve that controls the contact pressure between the conical disks.

As shown in FIG. 5, the method in accordance with the invention can run continuously, so that another cycle can be carried out after an adjustment of the actuator for the control valve.

The modulator utilized in step 52 can be in continuous operation and the slow, timewise change of the adjusting value that determines the position of the valve can be superimposed on a modulation fluctuation. Alternatively, the modulation and appropriately the method in accordance with the invention can occur only in predetermined time windows, in which an especially accurate control of the valve or the contact pressure of the conical disks results.

The adjustment of the valve based upon the evaluation of the correlation value can take place incrementally which means independently of the value of the deviation between the correlation value and the correlation target value, which can be performed until the deviation falls below a threshold value. The control can also take place proportionally or in accordance with other strategies.

The method in accordance with the invention can be changed in various ways. For example, instead of the input rotational speed and the output rotational speed the input torque and the output torque of the transmission can be determined and utilized for a correlation calculation similar to the method explained in FIG. 5. The determination of the rotational speeds has the advantage, moreover, that it can be done with available sensors. Instead of determining the rotational speeds or the torques, their changes over time could be determined or calculated and taken as the basis for the correlation calculation.

All suitable algorithms with which time-based relations between two measured values can be quantified can be introduced for the correlation calculation.

The correlation target value that is stored in control unit 18 can be dynamic, meaning it can depend on the operating parameters of the entire drive train, for example, whether driving on slippery ground where the drive train should be protected from torque fluctuations under circumstances caused by possibly suddenly slipping wheels, that is, the slippage of the transmission and therewith the contact pressure can be reduced, etc. The method In accordance with the invention can also be utilized with appropriate sensor placements for the control of the clutch or other devices that transmit torque in a frictionally-engaged manner, for example also a brake.

In accordance with the invention, the following actuation mechanisms can be utilized, for example:

An engine actuation: The engine is utilized as an actuation source based on its irregular movements.

A modulation of the transmitting capacity: The performance-transmitting component, such as, for example, a clutch or a conical disk set of a transmission, has an adjustment value with which the transmitting capacity can be influenced (e.g., contact pressure). If a periodic function is superimposed on the adjustment value signal, the transmitting capacity can be modulated.

An irregularly geared input step: Based upon an irregularly-operating input step, a rotational speed/rotational speed modulation can likewise be created. The actuation frequency is a function of the rotational speeds.

In accordance with the invention the following values can be utilized as signals:

Input rotational speed (or derived values, such as rotational acceleration);

Output rotational speed (or derived values, such as rotational acceleration);

Input torque;

Output torque;

Adjustment values for the modulation of the transmitting capacity;

Difference between the input and output rotational speeds; and

Ratio of the input rotational speed to the output rotational speed

The signals can be subjected to a filter routine, (for example, high pass, band pass, low pass) or any other process before further processing.

In accordance with the invention the following evaluation methods can be utilized:

Cross-correlation between each of two differing signals. The cross-correlation can be normalized or not normalized. Likewise, the maximum or minimum occurring correlation coefficient for different shift times can also be selected.

Fourier transformation for each of the above-identified signals.

Filtration of one of the above-named signals.

Lock-in method (between two different signals; the method is explained briefly below).

Combinations of actuation mechanisms, signals, and evaluation methods are also suitable for slippage determination in accordance with the invention. The change of the transmitting capacity can be utilized, for example, as a means of modulation. The rotational speed difference and the adjustment value of the modulation can serve, for example, as an evaluation signal. The slippage can be determined with the method in accordance with the lock-in principle.

Reference should be made to FIGS. 6a to 6e for details of the lock-in principle. The lock-in process is a method for detecting a signal that is weaker than noise or interference signals.

Figure 6A:
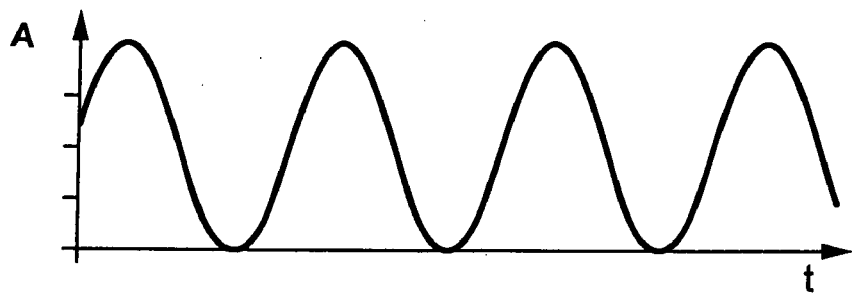
Figure 6B:
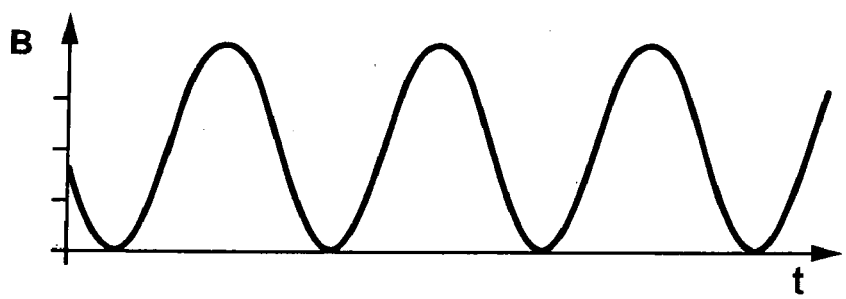

The operation of the lock-in is schematically shown in FIGS. 6a to 6e. In FIG. 6a, a signal A is shown as a function of time. Signal A is, for example, the measured contact pressure signal of a transmission. In FIG. 6b, a signal B is shown as a function of time. Signal B is the result of the measurements of the rotational speeds of a first conical disk set and a second conical disk set and a subsequent differential form of the rotational speeds.

Figure 6C:
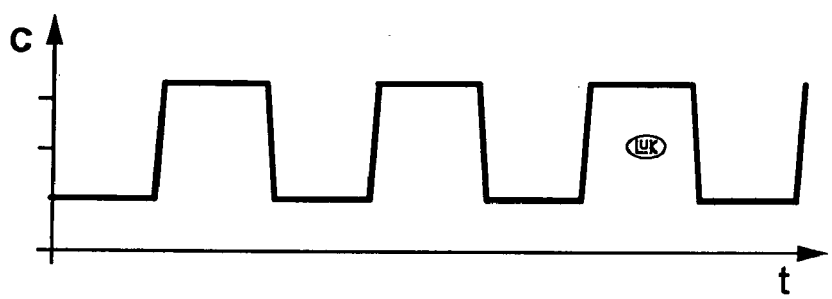
Figure 6D:
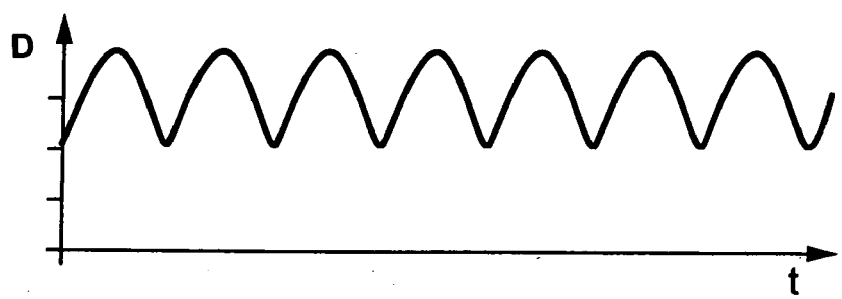
Figure 6E:
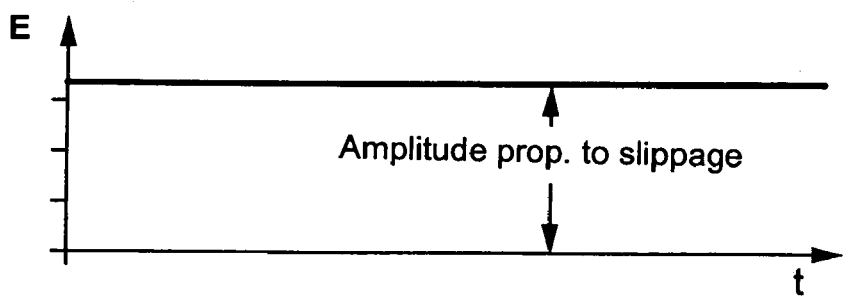

A signal C is shown as a function of time in FIG. 6c. Signal C is derived from reference signal A. That signal only assumes values between −1 and 1 and contains the correct "cycle" of the contact pressure reference signal. If signal C is multiplied by signal B, the amplitudes of the differential rotational speeds are "lapped" upwards, see FIG. 6d with signal D. If one subsequently applies a low pass filter to signal D, the result is an average amplitude, as can be seen from signal E, see FIG. 6e. The amplitude of signal E is proportional to the slippage of the variable speed unit or of the system of the clutch or the transmission.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

The invention claimed is:

1. A method for regulating the torque-transmitting capacity of a torque-transmitting assembly in the drive train of a motor vehicle and that is frictionally engaged between an input and an output, said method comprising the steps of:
   detecting an input value parameter and an output value parameter of the assembly,
   providing an adjustment value that influences the torque-transmitting capacity of the assembly,
   modulating by the adjustment value an operating parameter of the assembly that influences the torque-transmitting capacity,
   subjecting the detected input and output values to a correlation calculation in which a correlation value between the input and output values is calculated,
   determining the difference between the calculated correlation value and a predetermined target correlation value and,
   changing the adjustment value in the direction of a reduction of the correlation value difference when the difference exceeds a pre-determined threshold value.

2. A method in accordance with claim 1, wherein the input and output values are detected during the same time interval during which the adjustment value is modulated.

3. A method in accordance with claim 1, including the step of filtering the detected values before the correlation calculation.

4. A method in accordance with claim 1, wherein at least one of the target correlation value and a difference threshold value are functions of the operational parameters of a drive train included in the assembly.

5. A method in accordance with claim 1, including the step of detecting the input rotational speed and the output rotational speed of the torque-transmitting assembly.

6. A system for regulating the torque-transmitting capacity of a frictionally-engaged torque-transmitting assembly, in the drive train of a motor vehicle, said system comprising; a control unit for setting an adjustment value that determines the torque-transmitting capacity of the assembly, a modulation unit for modulating the adjustment value, a sensor for detecting an input parameter value of the assembly, a sensor for detecting an output parameter value of the assembly, and an electronic control unit including a processor and a storage unit for regulating the toque-transmitting capacity of the assembly.

7. A system in accordance with claim 6, whereby the torque-transmitting assembly is a steplessly adjustable, continuously variable transmission.

8. A method for regulating the torque-transmitting capacity of a torque-transmitting assembly in the drive train of a motor vehicle and that is frictionally engaged between an input and an output, said method comprising the steps of:
   impressing upon an operating parameter modulation signal associated with the assembly an adjustment value for influencing the torque-transmitting capacity of the assembly,
   detecting at least two measured value signals representing operating values of the assembly between the output and the impression of the modulation signal,
   processing the at least two measured value signals,
   subjecting the at least two measured values to a correlation calculation in which a correlation value is calculated, and
   utilizing the correlation value for correcting the adjustment value.

* * * * *